United States Patent [19]

Sato et al.

[11] Patent Number: 5,015,793

[45] Date of Patent: May 14, 1991

[54] ELECTRICAL INSULATING OIL COMPOSITION

[75] Inventors: Atsushi Sato, Tokyo; Shigenobu Kawakami, Ichikawa; Keiji Endo, Yokosuka; Hideyuki Dohi, Yokohama, all of Japan

[73] Assignee: Nippon Petrochemicals Company, Limited, Tokyo, Japan

[21] Appl. No.: 93,803

[22] Filed: Sep. 4, 1987

[30] Foreign Application Priority Data

Sep. 4, 1986 [JP] Japan ................................ 61-208540

[51] Int. Cl.[5] .......................... H01G 4/22; H01B 3/22

[52] U.S. Cl. ...................................... 585/6.3; 252/570; 361/315; 361/327; 585/25

[58] Field of Search ...................... 585/6.3, 6.6, 24, 25; 361/315, 323, 327; 252/570

[56] References Cited

U.S. PATENT DOCUMENTS

| | | | |
|---|---|---|---|
| 4,054,937 | 10/1977 | Mandelcorn et al. | 585/6.3 |
| 4,266,264 | 5/1981 | Mandelcorn et al. | 585/6.3 |
| 4,320,034 | 3/1982 | Lapp et al. | 585/6.3 |
| 4,409,413 | 10/1983 | Iwayama et al. | 585/6.3 |
| 4,442,027 | 4/1984 | Sato et al. | 585/6.3 |
| 4,493,943 | 1/1985 | Sato et al. | 585/6.3 |
| 4,506,107 | 3/1985 | Sato et al. | 585/6.3 |
| 4,523,044 | 6/1985 | Commandeur et al. | 585/6.3 |
| 4,543,207 | 9/1985 | Sato et al. | 585/6.34 |
| 4,543,207 | 9/1985 | Sato et al. | 585/6.3 |
| 4,549,034 | 10/1985 | Sato et al. | 585/6.3 |
| 4,568,793 | 2/1986 | Sato et al. | 585/6.3 |
| 4,621,302 | 11/1986 | Sato et al. | 585/6.3 |
| 4,639,832 | 1/1987 | Sato et al. | 585/6.3 |
| 4,642,730 | 2/1987 | Sato et al. | 585/6.3 |
| 4,681,980 | 7/1987 | Sato et al. | 585/6.3 |
| 4,734,824 | 3/1988 | Sato et al. | 585/6.3 |
| 4,755,275 | 7/1988 | Sato et al. | 585/6.3 |

*Primary Examiner*—Asok Pal

*Attorney, Agent, or Firm*—Scully, Scott, Murphy & Presser

[57] ABSTRACT

An electrical insulating oil composition having good low temperature characteristics which comprises at least 4 members selected from the group consisting of (a) m-ethylbiphenyl, (b) p-ethylbiphenyl, (c) o-benzyltoluene, (d) m-benzyltoluene, (e) p-benzyltoluene, (f) 1,1-diphenylethane, and (g) 1,1-diphenylethylene; and is characterized in that the proportion of solid phase at a temperature of −40° C. of the electrical insulating oil composition is not more than 45% by weight and the proportion of the total quantity of solid phase is calculated according to the following general equation of solid-liquid equilibrium:

$$X_i = \exp\left[\frac{\Delta Hf}{R}\left(\frac{1}{Tf} - \frac{1}{T}\right)\right]$$

wherein $X_i$ is the equilibrium mole fraction of a component i in the liquid phase of the composition, $\Delta H_f$ is the heat of fusion (cal.mol$^{-1}$), $T_f$ is the melting point (K), t is the temperature (K), and R is the gas constant (cal.-mol$^{-1}$.K$^{-1}$).

6 Claims, 6 Drawing Sheets

FIG. 3-A
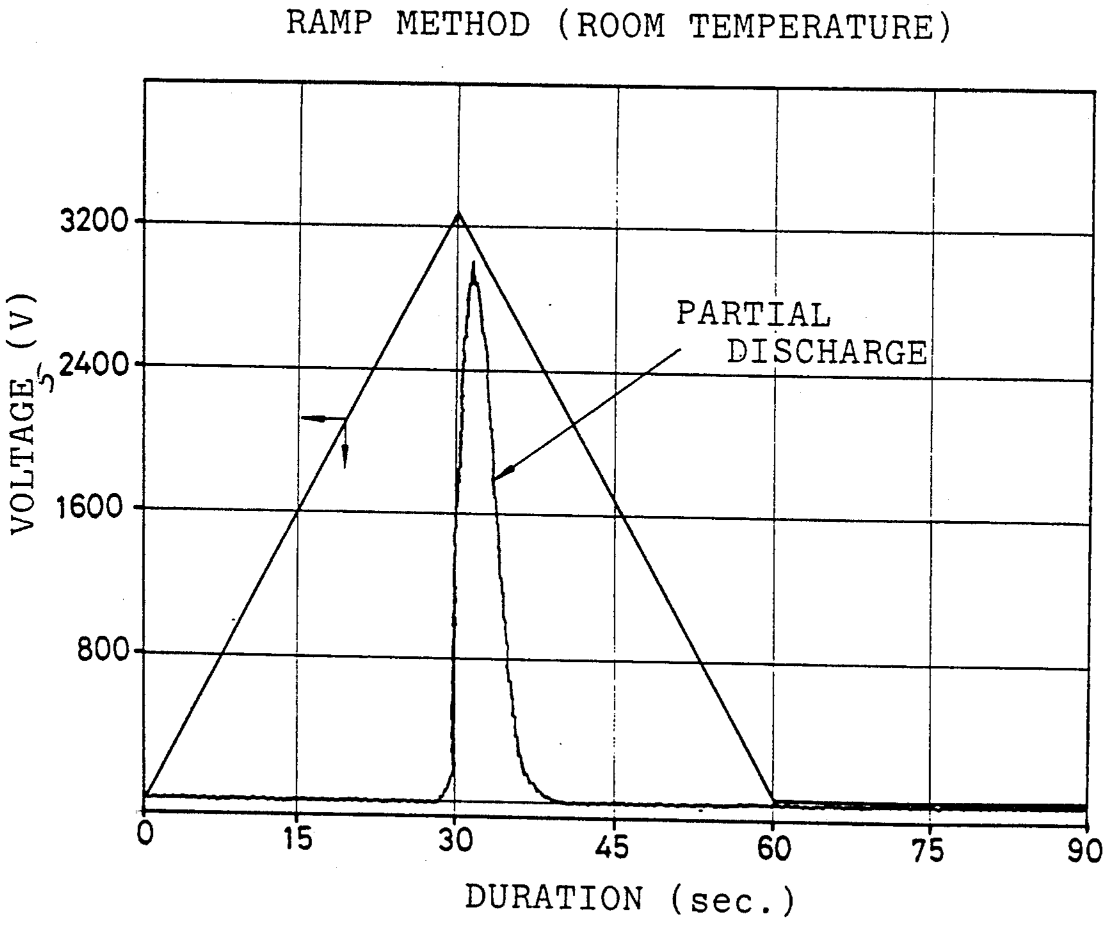

FIG. 3-B
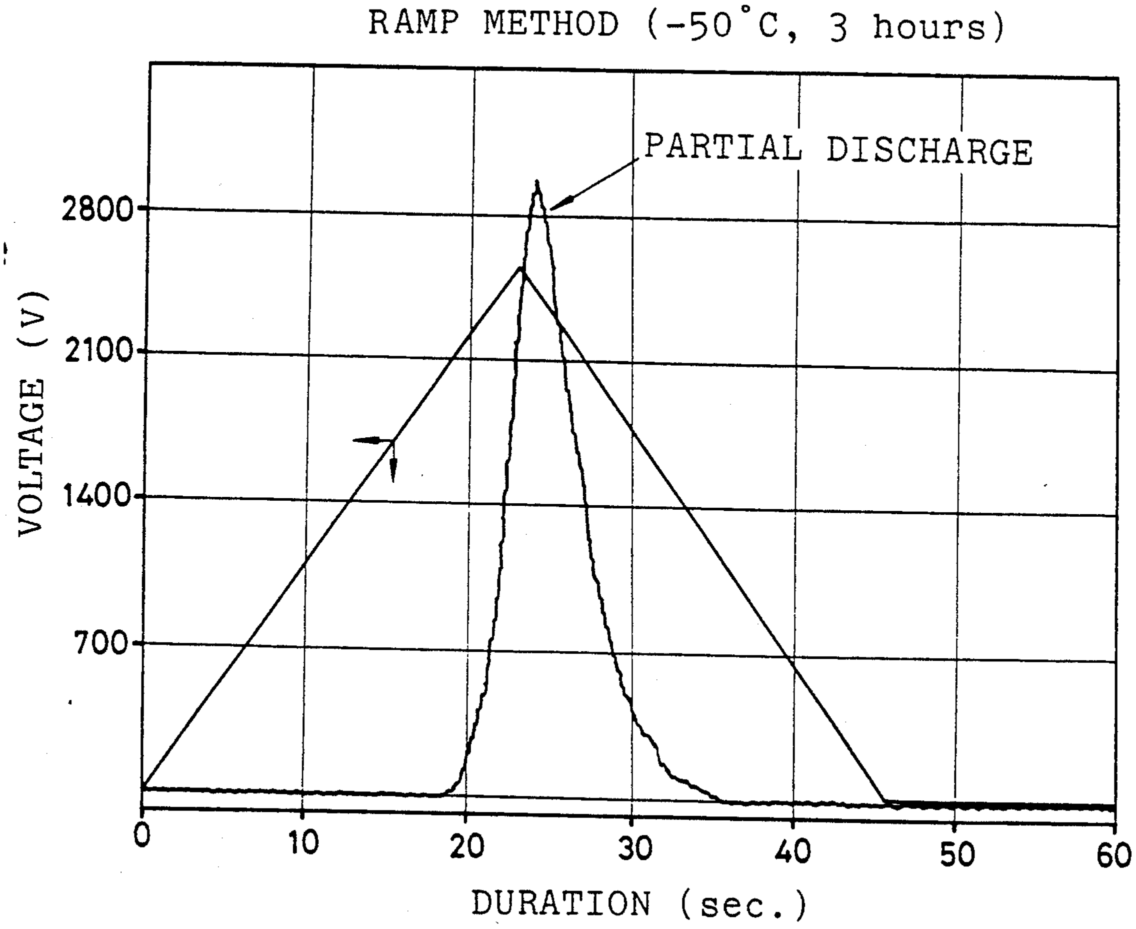

FIG. 3-C
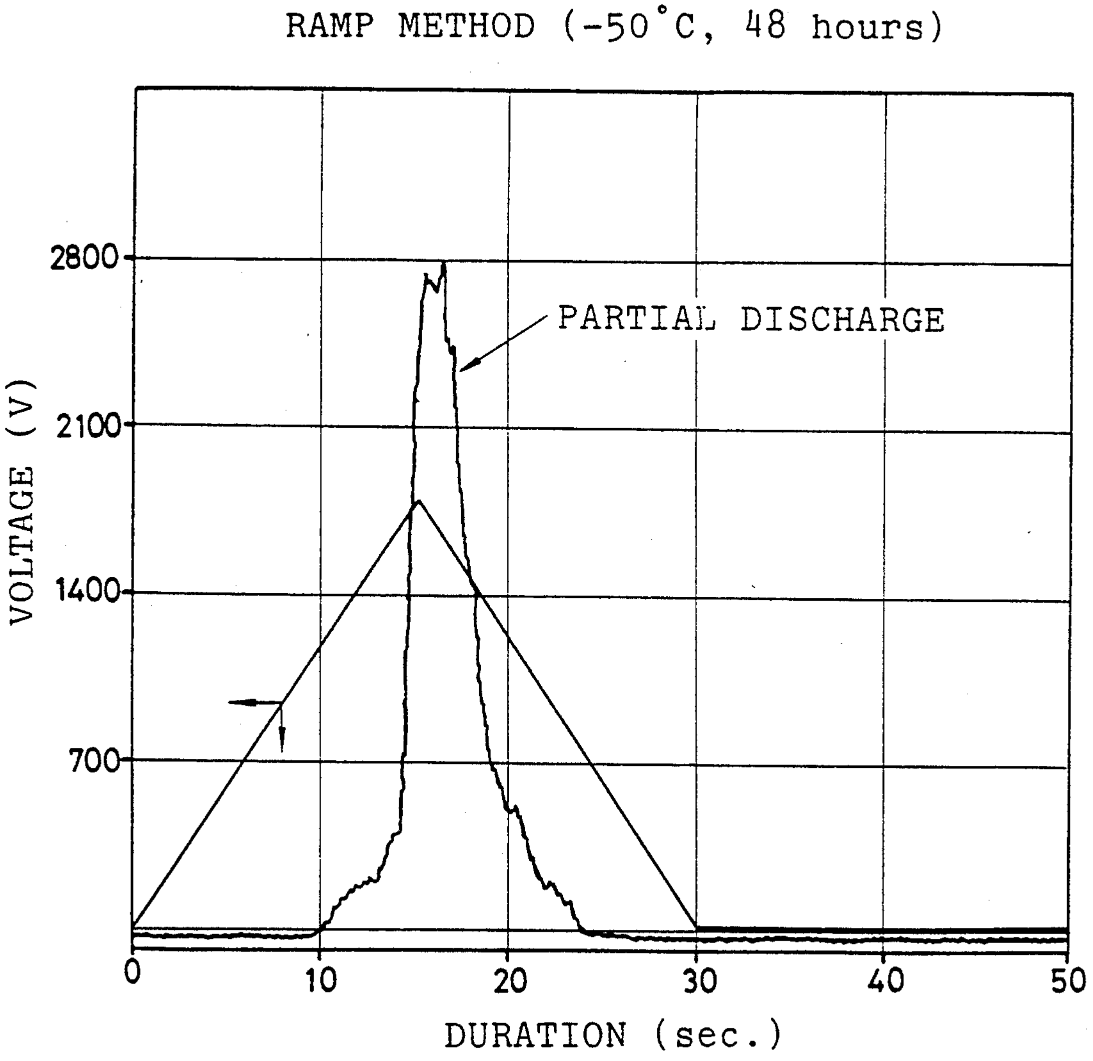

(*): SYMBOLS A TO D INDICATE STATES OF PARTIAL DISCHARGE AT RESPECTIVE TEMPERATURES

ELECTRICAL INSULATING OIL COMPOSITION

BACKGROUND OF THE INVENTION

1. Field of the Invention

This invention relates to an electrical insulating oil composition. More particularly, the invention relates to an electrical insulating oil composition which is excellent in low temperature characteristics and hydrogen gas absorbing capacity and is suitable for use in impregnating electric capacitors.

2. Description of the Prior Art

In the 1960s, polychlorinated biphenyl (PCB) was widely used as the insulating oil for high-tension capacitors for electric power supply. After the toxicity of PCB became an issue, various kinds of insulating oils have been proposed in place of PCB. The insulating oils which were industrially produced in 1970s as substitutes for PCB are classified into two groups. One group includes the mixture of chlorinated alkyldiphenyl ether, phthalic acid ester and benzene trichloride; and benzyl alcohol and esters of fatty acids; with which the oil having a high dielectric constant like PCB was aimed. The other group is exemplified by bicyclic aromatic hydrocarbons such as phenylxylylethane (PXE) and monoisopropylbiphenyl (MIPB). These insulating oils have an advantage in a partial discharge characteristic as compared with the former ones which have a high dielectric constant. Furthermore, the insulating oils of the latter group are low in viscosity, excellent in impregnating property, especially in the infiltration into spaces among layers of films, which enabled the industrial production of all-film-type capacitors (plastic film is used in place of insulating paper).

With the wide spread of all-film-type capacitors in 1980s, the production of insulating oils of the former group having a high dielectric constant was stopped because they are inferior in partial discharge characteristic and impregnating property, in addition, the advantage of the high dielectric constant hardly contributes to the performance of all-film-type capacitors.

With regard to the insulating oils of bicyclic aromatic hydrocarbons, several proposals have been made in order to improve their properties further. For instance, the ratio of aromatic portion (aromaticity) is increased in order to improve the partial discharge characteristic. More particularly, the molecular weight is lowered by reducing the number of aliphatic carbon atoms with maintaining the bicyclic aromatic structure. Such the insulating oil is exemplified by benzyltoluene disclosed in Japanese Patent Publication No. 55-5689. A good partial discharge characteristic can be expected of the benzyltoluene because the compound is low in molecular weight and high in aromaticity as compared with the foregoing MIPB and PXE.

With the use of the insulating oils of bicyclic aromatic hydrocarbons in place of PCB, the all-film type capacitors could be put on a commercial basis and the low temperature characteristic of the product could be improved. It is considered that the above advantages are brought about by the improvement in viscosity and pour point at lower temperatures which improve the partial discharge at lower temperatures.

As for the foregoing period in which PCB was used, according to the standard of IEC for insulating oils (Publication, 588-3 (1977), Askarels for Transformers and Capacitors), the viscosity and the pour point are prescribed as follows:

The Type C-1 for capacitors is a mixture of the isomers of dichlorobiphenyls and trichlorobiphenyls and it is prescribed that the viscosity is 30 to 40 cSt ($\times 10^{-2}$ $cm^2$/sec) at 20° C. and the pour point is −24° C. With regard to trichlorobiphenyl of Type C-2, the viscosity is 41 to 75 cSt ($\times 10^{-2}$ $cm^2$/sec) and the pour point is −18° C., which pour point is relatively high. Accordingly, the behavior of the characteristics of capacitors in the lower temperature region near and below the pour point is a serious question in the designing of capacitors. As the method for investigating such a behavior of the low temperature characteristics, there is EDF Test Method that is proposed by Eléctricité de France and is employed on a world-wide level. In this test method, samples are cooled to −25° C. in a refrigeration chamber during the night, and in the next morning, they are taken out of the refrigeration chamber and at an ordinary temperature, they are applied with electric voltages containing impulses which will occur in a transition phenomenon, thereby investigating their durability. The efficiency was confirmed by repeating such an operation every day for a long period of time. In other words, the temperature of −25° C. was considered as a critical temperature for this period as will be understood from the foregoing description on the viscosity and pour point. When devices are started at temperatures lower than this temperature, it was considered to be a good method for starting to warm up by, for instance, gradually applying electrical loads.

As the solid insulating substance to be used together with PCB, insulating paper or combined films of insulating paper and biaxially oriented polypropylene film (PP-film) was employed. However, the power loss as the whole capacitors were increased, especially at lower temperatures, because the power loss of both paper and PCB is large. For example, the loss at temperatures of −10±20° C. is approximately 0.1%, meanwhile the loss is abruptly increased by ten times to 1% at temperatures of −20° C. to −30° C. For this reason, the generation of heat in the capacitor becomes large and the temperature rise of 20° C. to 30° C. is caused to occur by heat generation, which depends upon the sizes of capacitors and the configurations of solid insulating materials and electrodes. As a result, even when the temperature of an insulating oil is at a pour point or below, the temperature is gradually raised by the internal heat generation of the capacitor, the temperature thus exceeds the pour point of the insulating oil in due course, and finally, the viscosity is lowered and the insulating oil can act as a liquid substantially. Accordingly, in the above-mentioned EDF Test, in the process of the change of an insulating oil from a solid state to a liquid state during the electrical loading, even when partial discharge is caused to occur in the initial stage, it is ceased with the passage of loading time. As described above, the change of power loss, the accompanying temperature change, the change of the state of insulating oil, and the condition of partial discharge are entangled in said method, thereby determining the final deterioration in the characteristics of a capacitor and its overall durability such as dielectric breakdown. This test method excels in that various factors and their interrelation can be evaluated collectively. The thus obtained results are, however, too complicated to analyze the test determinative factors. This test was developed mainly to test the appliances impregnated with PCB.

Therefore, the drawbacks of this test method are no more than the undesirable behavior that is brought about by the characteristic properties of PCB as an insulating oil. A new test method for newly developed insulating oils is necessary from the above viewpoint.

Meanwhile, the bicyclic aromatic hydrocarbons such as PXE and MIPB that have come on as substitutes for PCB are now used for the all-film type capacitors as leading insulating oils. The pour points of them are below $-50°$ C., with which the low temperature characteristics were surely improved.

However, the viscosity near the pour point is very high. For example, the viscosities of MIPB and PXE at $-50°$ C. are above 10,000 cSt ($\times 10^{-2}$ $cm^2$/sec). The high viscosity like this is not desirable because the diffusion of the hydrogen gas that is released in partial discharge is hindered. Therefore, desirable viscosity is below 2000 cSt ($\times 10^{-2}$ $cm^2$/sec), and more prefereably below 1000 cSt ($\times 10^{-2}$ $cm^2$/sec).

Though the dielectric loss of these bicyclic aromatic hydrocarbons varies according to the shapes of electrodes and impurities in insulating oils, it is on the level of about 0.01% to 0.02% which is one tenth of the capacitor with PCB. Even at temperatures as low as $-40°$ C., the dielectric loss does not exceed 0.1%. Accordingly, it is a characteristic feature that the temperature rise in a capacitor owing to the dielectric loss is less than 5° C. In other words, the dielectric loss increases with the lowering of temperature in the case of PCB, however, in the case of the bicyclic aromatic hydrocarbons, the compensation by the heat generation of dielectric loss cannot be expected in low temperature conditions, especially in extremely low temperature conditions of $-40°$ C. to $-50°$ C. Accordingly, it is inevitable that the insulating oil itself can fully withstand the low temperatures, that is, in liquid at a very low temperature.

The insulating oils of bicyclic aromatic hydrocarbons that are used at present are the foregoing PXE and MIPB; and the mixture of monobenzyltoluene (MBT) and dibenzyltoluene (DBT). Any of these substances has a low temperature characteristic that is superior to that of PCB. In order to improve further the adaptability and the partial discharge characteristic at lower temperatures, the inventors of the present application have made detailed investigation with regard to the relation between the structures of noncondensed bicyclic aromatic hydrocarbons and the properties of them as electrical insulating oils.

In the first place, alkyl groups having 1 to 5 carbon atoms were added to the skeletal carbon chains of 1,1-diphenylethane so as to synthesize the model compounds of the basic skeletal structure of bicyclic aromatic hydrocarbons. The properties as synthetic oils were investigated with regard to the six kinds of synthetic oils including the compound having only the basic skeletal structure.

The structures of the synthetic oils are represented by the following structural formula:

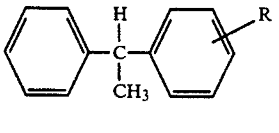

wherein R is a mixture of methyl group, dimethyl group, and ethyl group; isopropyl group, tert-butyl group, and tert-amyl group.

Each of the synthetic oils was refined by clay treatment to make the dielectric loss tangent below 0.02% at 80° C., which was followed by several kinds of tests as insulating oils for capacitors. In order to observe the basic property as insulating oils, hydrogen gas absorbing capacity was measured, the results of which are shown in FIG. 1. According to these results, the hydrogen gas absorbing capacity increases with the decrease of the number of carbon atoms in substituent groups, i.e., with the rise of aromaticity (the percentage of aromatic carbons in the total structure). Taking the above fact into consideration, all-film type model capacitors were made by using the respective synthetic oils and their performance was tested as follows.

Two sheets of 14 micrometer thick biaxially oriented polypropylene films were put together to overlap each other. With using the thus prepared films as insulating materials, aluminum foil 7 micrometer thick was wound to obtain capacitors of 0.3 to 0.4 $\mu$F.

Breakdown voltages were measured by applying electric voltage to these capacitors in a room at a temperature of $25\pm3°$ C. An electric voltage (2400 V) which corresponds to 50 V/$\mu$m in potential gradient was applied to the capacitors for 24 hours and after that, the electric voltage was raised by 10 V/$\mu$ at an interval of 48 hours. The number of capacitors was 6 for each synthetic oil and the times at which capacitors were broken down were recorded and their average was taken as the value of each group of capacitors.

The results obtained in the above tests are shown in FIG. 2. According to these results, the voltage withstanding characteristics become higher with the rise of aromaticities of the compounds, that is, the lowering of molecular weights, which correspond to the tendency of hydrogen gas absorbing capacities of the compounds shown in FIG. 1.

It was understood from the results shown in FIG. 1 and FIG. 2 that the hydrogen gas absorbing capacity and the voltage withstanding characteristic become better with the lowering of the molecular weights of bicyclic aromatic hydrocarbons.

The viscosity becomes low with the lowering of molecular weight of bicyclic aromatic hydrocarbon, however, the melting point becomes high because the compound structure is simplified, which fact makes worse the low temperature characteristics.

In the following Table 1, the melting point of bicyclic aromatic hydrocarbon (non-condensed type) having 12 carbon atoms which is biphenyl and has a lowest molecular weight in the non-condensed type bicyclic aromatic hydrocarbons, and those of non-condensed type bicyclic aromatic hydrocarbons having 13 carbon atoms (the number of carbon atoms is larger by 1 than biphenyl) are shown.

The melting points of all of them are high, in addition, the flash points of them are low. Accordingly, they are not suitable as inevitable components for use in preparing electrical insulating oils or electrical insulating oil compositions.

TABLE 1

| Melting Points of Bicyclic Aromatic Hydrocarbons (Non-Condensed Type) | | |
|---|---|---|
| Substance | Number of Carbon Atoms | Melting Point (°C.) |
| Biphenyl | 12 | +69.1 |
| 2-Methylbiphenyl | 13 | −0.2 |
| 3-Methylbiphenyl | 13 | +6 |
| 4-Methylbiphenyl | 13 | +51.5 |
| Diphenylmethane | 13 | +26.5 |

According to FIGS. 1 and 2, in view of the hydrogen gas absorbing capacity and the breakdown voltage, the bicyclic aromatic hydrocarbon having 14 carbon atoms are most preferable among those having not less than 14 carbon atoms. Accordingly, it is considered that an electrical insulating oil composition having good low temperature characteristics at −40° C. to −50° C., can be prepared by using such the materials.

The bicyclic aromatic hydrocarbons having 14 carbon atoms are exemplified by dimethylbiphenyls, ethylbiphenyls, methyldiphenylmethanes, 1,1-diphenylethane and 1,2-diphenylethane; corresponding compounds having an ethylenic double bond such as vinylbiphenyls, 1,1-diphenylethylene and 1,2-diphenylethylene; and the position isomers and stereo-isomers of them.

The number of bicyclic aromatic hydrocarbons having 14 carbon atoms is particularly large as compared with those having 12 or 13 carbon atoms. It is quite impossible by the conventional method of trial and error to select suitable compounds from the former ones that are satisfactory in view of their properties and their industrial applications and to clarify the compositions and characteristics of insulating oils. In practice, any electrical insulating oil or electrical insulating oil composition of the bicyclic aromatic hydrocarbons having 14 carbon atoms which has advantageous properties at temperatures of below −40° C., or more preferably −50° C., has never been used.

In order to create a new electrical insulating oil composition which has excellent low temperature characteristics, the following study was made. In view of the properties and industrial utility, some promising compounds which are considered to be inevitable components for an electrical insulating oil composition having good low temperature characteristics, were selected from the bicyclic aromatic hydrocarbons having 14 carbon atoms. The behavior at low temperatures of the multi-component systems of these compounds were clarified in a manner which has never been tried in the past.

More particularly, there are 12 kinds of position isomers of dimethylbiphenyls. A method to methylate biphenyl is known as an economical method for synthesizing dimethylbiphenyls. In this method, methyl groups are often oriented symmetrically due to the orientation of the substituent groups. As a result, a mixture of symmetrical dimethylbiphenyls is obtained and the inclusion of high-boiling components cannot be avoided. The symmetrical dimethylbiphenyls are, for example, 2,2'-dimethylbiphenyl (melting point: +20° C.)
3,3'-dimethylbiphenyl (melting point: +9° C.), and
0 4,4'-dimethylbiphenyl (melting point: +122.5° C.).

Accordingly, the dimethylbiphenyls cannot be the inevitable component for the industrial electrical insulating oil composition having good low temperature characteristics.

Among ethylbiphenyls, there are 3 kinds of position isomers, o-ethylbiphenyl, m-ethylbiphenyl and p-ethylbiphenyl. In the industrial synthesis of these ethylbiphenyls, they are produced by ethylation of biphenyl or transalkylation of ethylbenzene with biphenyl, in which most of the products are m-ethylbiphenyl and p-ethylbiphenyl, while o-ethylbiphenyl is hardly produced in this method.

Accordingly, among the ethylbiphenyls, those which can be inevitable components for the electrical insulating oil composition having practically good low temperature characteristics are m-isomer and p-isomer.

Methyldiphenylmethanes (benzyltoluenes) are industrially produced and are practically used as electrical insulating oils, so that they can be promising compounds for the electrical insulating oil composition having good low temperature characteristics.

The melting point of 1,1-diphenylethane is as low as −18° C., so that it can be a promising compound.

The melting point of 1,2-diphenylethane is as high as +51.2° C. and the heat of fusion is large, so that it cannot be a component of the insulating oil because the temperature of crystallizing out becomes high even when it is contained as one component of an electrical insulating oil.

As disclosed in U.S. Pat. Nos. 4,493,943; 4,506,107; and 4,618,914, the bicyclic aromatic hydrocarbons having ethylenic double bonds are interesting compounds as the component materials for electrical insulating oils. Among them, there are 3 groups that have 14 carbon atoms, vinylbiphenyls, 1,1-diphenylethylenes and 1,2-diphenylethylenes (trans- and cis-stilbene). Among them, the vinylbiphenyls are not desirable because they are liable to polymerize. The trans-stilbene is out of the question because the melting point thereof is as high as +122° C. Even though the cis-stilbene cannot be used singly, it can be used by being mixed with other components. However, stilbenes, on the whole, have a conjugated structure, so that the influence of them on living bodies is apprehended. While, 1,1-diphenylethylene passed a mutagen test (Ames test) according to the investigation of the present inventors and it is considered that the compound is safer than stilbenes.

Accordingly, 1,1-diphenylethylene is only one practically available compound among the bicyclic aromatic hydrocarbons having 14 carbon atoms and ethylenic double bonds.

The melting point of 1,1-diphenylethane itself is low enough and it can be used as one component of the insulating composition.

From the above discussion, the compounds (a) to (g) in the following Table 2 are nominated for promising materials of the electrical insulating oil composition.

TABLE 2

| Melting Points and Heats of Fusion of Bicyclic Aromatic Hydrocarbons Having 14 Carbon Atoms | | |
|---|---|---|
| Compound | Melting Point (°C.) | Heat of Fusion (cal/mol) |
| (a) 3-Ethylbiphenyl (m-isomer) | −27.6 | 4000 |
| (b) 4-Ethylbiphenyl (p-isomer) | +35.5 | 2810* |
| (c) o-Benzyltoluene | +6.6 | 5000 |
| (d) m-Benzyltoluene | −27.8 | 4700 |
| (e) p-Benzyltoluene | +4.6 | 4900 |
| (f) 1,1-Diphenylethane | −18 | 4200 |
| (g) 1,1-Diphenylethylene | +8.6 | 3450* |

Reference Examples

TABLE 2-continued

| Melting Points and Heats of Fusion of Bicyclic Aromatic Hydrocarbons Having 14 Carbon Atoms | | |
|---|---|---|
| Compound | Melting Point (°C.) | Heat of Fusion (cal/mol) |
| 1,2-Diphenylethane | +51.2 | 5560* |
| trans-Stilbene | +126 | 6330* |
| cis-Stilbene | +2 | 3710* |
| 2-Ethylbiphenyl (o-isomer) | −6.1 | 3890 |

In Table 2, all the melting points were quoted from published references and the heats of fusion marked with asterisks (*) were actually measured by using Specific Heat Measuring Device, HS-3000 made by Shinku Riko Co., Ltd.

In a multi-component system, liquids are soluble to one another and, when components are solid, they are not mixed together and do not form any solid solution, and the solid-liquid equilibrium of multi-component system is represented by the following general equation according to thermodynamic theory:

$$X_i = \frac{1}{r_i} \exp\left[\frac{\Delta Hf}{R}\left(\frac{1}{Tf} - \frac{1}{T}\right)\right]$$

wherein $X_i$ is the equilibrium mole fraction of a component i in the liquid phase of the multi-component system, $\Delta Hf$ is the heat of fusion ($cal.mol^{-1}$) of said component i as a pure substance, $Tf$ is the melting point (K) of said component i as a pure substance, T is the temperature (K) of the system, $r_i$ is an activity coefficient, and R is the gas constant ($cal.mol^{-1}. K^{-1}$).

According to the experiment of the present inventors, there is no problem by assuming that the above activity coefficient $r_i$ equals 1 at least in the bicyclic aromatic hydrocarbons having 14 carbon atoms as shown in the foregoing Table 2, so that the above equation will be used hereinafter with $r_i=1$.

With regard to an arbitrary electrical insulating oil composition of multi-components, the proportion of solid phase (crystalline phase) to the whole at, for example, −40° C. or −50° C., the starting point of crystallizing out, and the eutectic point can be calculated by the ordinary calculation method of solid-liquid equilibrium using the above equation.

Some of hydrocarbons in the foregoing Table 2 are already proposed as electrical insulating oils in published references. The characteristics of these substances will be calculated according to the above solid-liquid equilibrium equation.

For example, disclosed in Japanese Patent Publication No. 55-5689 is the use of an electrical insulating oil of o-benzyltoluene and p-benzyltoluene. The melting points of these hydrocarbons are +6.6° C. and +4.6° C., respectively. An electrical insulating oil having good low temperature characteristics cannot be made even from the mixture of these two components, without saying the case in which any of them is used singly. Up to now, any electrical insulating oil of these hydrocarbons is not practically used.

In U.S. Pat. No. 4,523,044; a composition comprising, for example, the composition of benzyltoluene and dibenzyltoluene prepared from benzyl chloride and toluene with a metal halide such as $FeCl_3$ and its preparation method, are disclosed. This composition is used as an electrical insulating oil. According to this reference, the low temperature characteristic is improved by mixing the by-product dibenzyltoluene to lower the melting point because the melting point of benzyltoluene is approximately −20° C.

The synthesis method of examples in these references were traced by the present inventors. The results was such that the reaction using this $FeCl_3$ is o- and p-orientation and obtained composition of benzyltoluenes was 48.9 mole % of o-isomer, 6.8 mole % of m-isomer and 44.3 mole % of p-isomer. With this composition, o-isomer firstly begin to precipitate at approximately −15° C. according to the foregoing equation, and at −20° C., more than a half of them separates out as crystals. Therefore, it is certain that the melting point is near −20° C., so that the low temperature characteristic of these benzyltoluenes is worse and it cannot be used practically. Even when the by-product of dibenzyltoluenes are added to the benzyltoluenes, the effect of depression of melting point of the composition is small for the amount of addition, because it depends upon the mole fraction of added substance while the molecular weight of dibenzyltoluene is high. More particularly, even though 20% by weight of the by-product dibenzyltoluene is added to the benzyltoluenes obtained by the method described in the above reference, the value in mole % is 14.3, which lowers the temperature of crystallizing out by only about 7° C. However, the addition of high molecular weight dibenzyltoluene as much as 20% by weight causes the significant increase of viscosity at low temperatures. If more dibenzyltoluene is added for depressing the melting point, the advantage in the low viscosity of benzyltoluene is much impaired, so that it is not practical.

The lowest temperature of crystallizing out of the mixture of three kinds of benzyltoluenes exists at the eutectic point calculated from the above solid-liquid equilibrium equation, at which the composition is o-isomer: 17.4 mole %, m-isomer: 63.4 mole %, and p-isomer: 19.2 mole %. The eutectic point is −38.9° C. Accordingly, without saying the product of the synthesis of benzyltoluene as disclosed in the foregoing reference, in any isomer mixture of the three kinds of benzyltoluenes at any compounding ratio, the mixture cannot exist in a liquid state at temperatures as low as −40° C. to −50° C.

In ethylbiphenyls, three kinds of position isomers exist likewise. That is, o-isomer, m-isomer, and p-isomer, and among them, the melting point of m-isomer is lowest. The eutectic point of these three kinds of isomers is −45.6° C. according to calculation using the above solid-liquid equilibrium equation, at which the composition is o-isomer: 28.1 mole %, m-isomer: 52.4 mole %, and p-isomer: 19.5 mole %. Accordingly, also in the case of ethylbiphenyls, the mixture of only the three kinds position isomers cannot exist in liquid phase at −50° C.

Of course, the synthesis method which produces mainly two-component system of position isomers can be employed, for example, in the synthesis of benzyltoluene or ethylbiphenyl.

For example, as disclosed in the foregoing U.S. Pat. No. 4,523,044 on benzyltoluene, benzylchloride and toluene are reacted using a halogenated metal to synthesize o- and p-oriented products. Or, biphenyl is (d) m-benzyltoluene,
(e) p-benzyltoluene,
(f) 1,1-diphenylethane, and
(g) 1,1-diphenylethylene and is characterized in that the ratio of solid phase at a temperature of −40° C. of said electrical insulating oil system is not more than 45% by weight, each component being calculated according to the foregoing equation of solid-liquid equilibrium. The electrical insulating oil composition which satisfies the above requirement at −50° C. of the system is more preferable.

BRIEF DESCRIPTION OF THE DRAWINGS

These and other objects and features of the present invention will become more apparent from the following description taken in connection with the accompanying drawings, in which:

FIGS. 3-A, 3-B and 3-C are graphic charts showing the results of ramp tests, respectively.

DETAILED DESCRIPTION OF THE INVENTION

Figure 1:
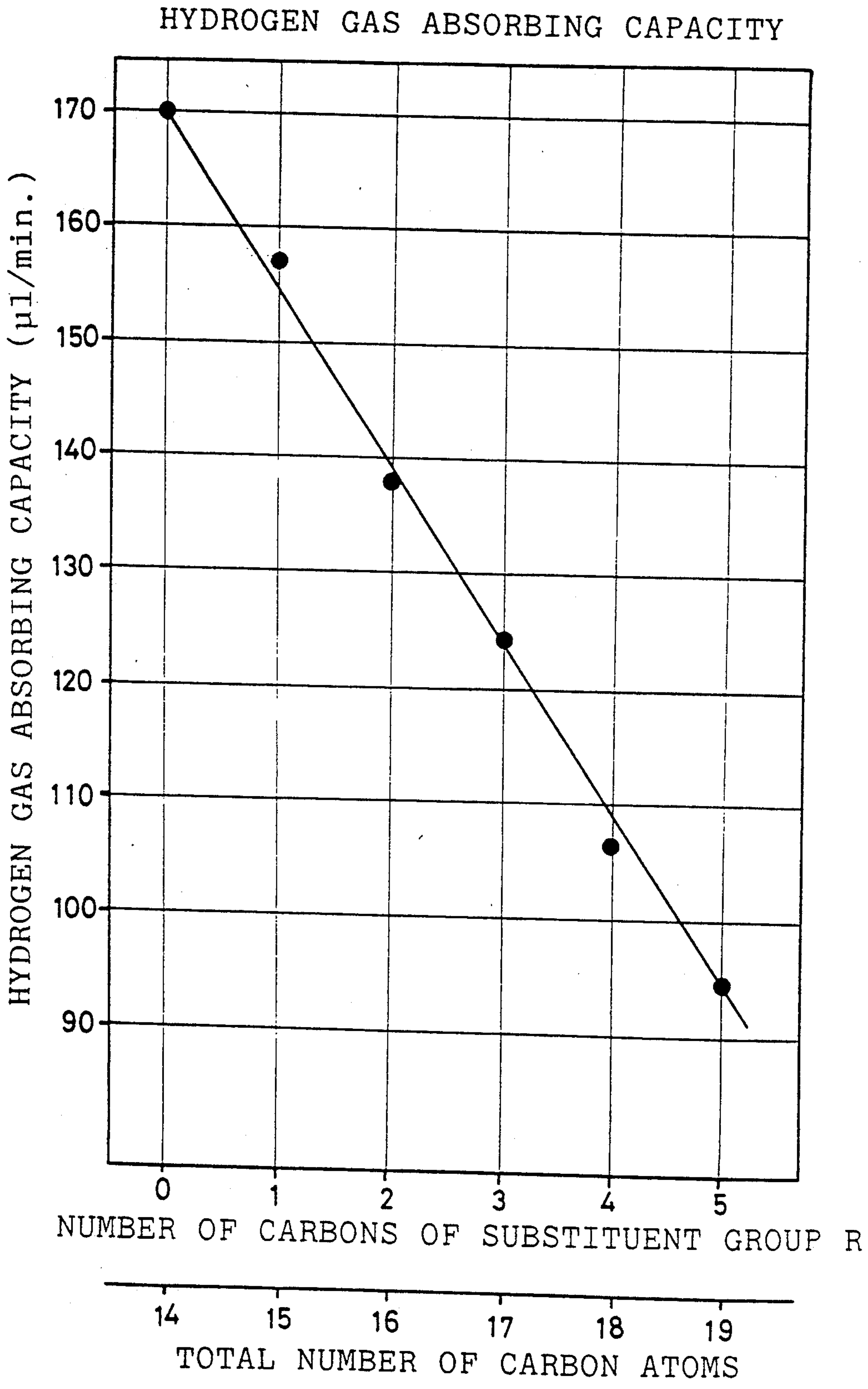
FIG. 1 is a graphic chart showing hydrogen gas absorbing capacities of bicyclic aromatic hydrocarbons.
Figure 2:
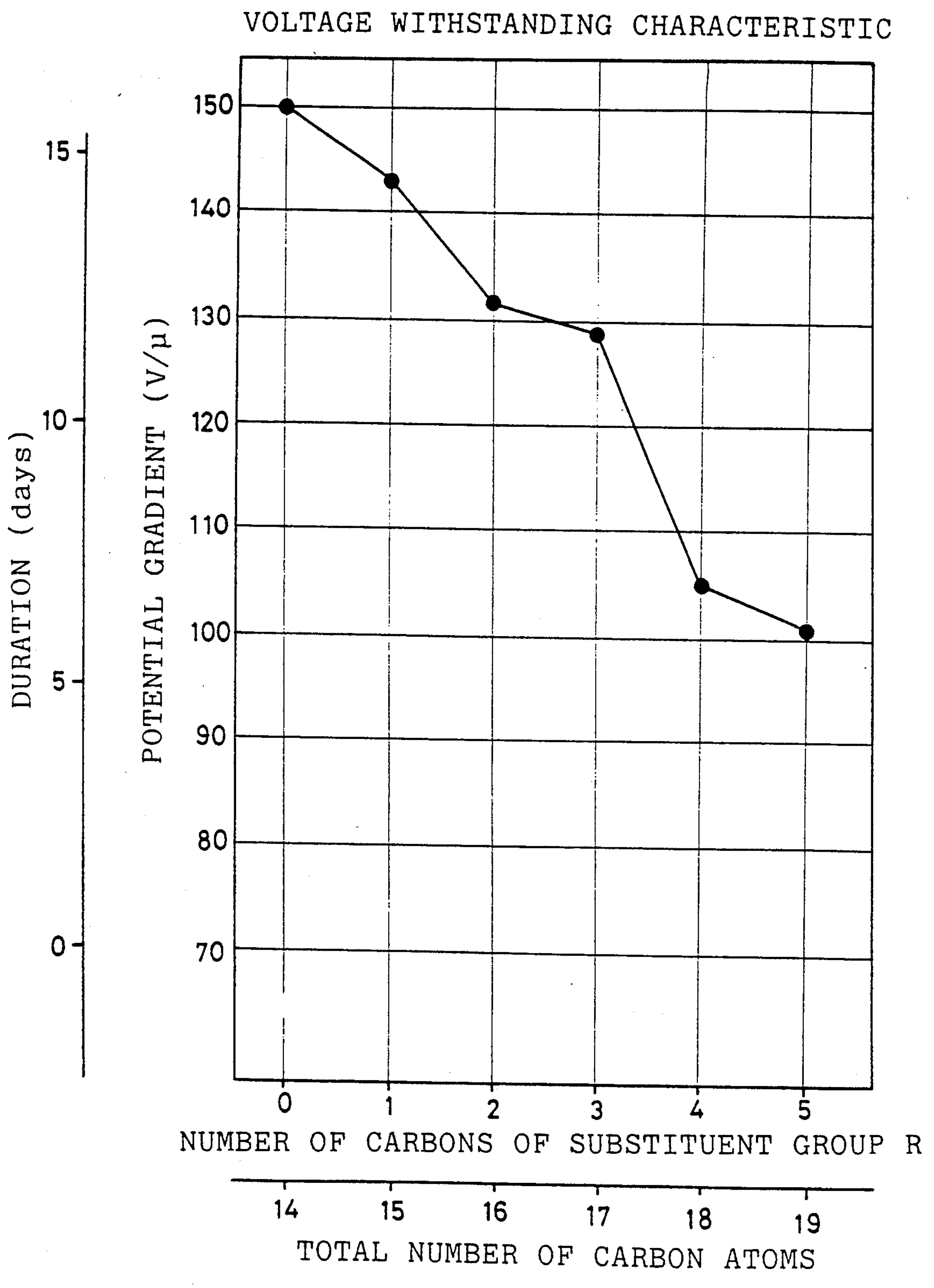
FIG. 2 is a graphic chart showing voltage withstanding characteristics of capacitors.

The present invention will be described in more detail.

The electrical insulating oil composition of the present invention contains as inevitable components at least 4 members selected from the group consisting of the foregoing 7 components (a) to (g) of bicyclic aromatic hydrocarbons having 14 carbon atoms.

Furthermore, the electrical insulating oil composition of the invention is characterized in that the proportion of solid phase (crystalline phase) at −40° C., preferably at −50° C. of the electrical insulating oil system is not more than 45% by weight relative to the total quantity of said composition when it is calculated according to the foregoing equation of solid-liquid equilibrium. The electrical insulating oil composition which satisfies the above requirement at −50° C. of the system is more preferable.

In the case that the electrical insulating oil composition consists of less than 4 components out of the 7 components of (a) to (g), the proportion of solid phase inevitably exceeds 45% by weight even at a temperature of −40° C. When the proportion of solid phase exceeds 45% by weight, the liquid phase becomes discontinuous, which impairs the absorption or diffusion of generated gas. As a result, the level of partial discharge of capacitors that are impregnated with such an oil, is lowered and the values themselves are liable to vary.

Accordingly, in the present invention, electrical insulating oil composition is to be made to contain 4 to 7 members among the foregoing 7 components of (a) to (g) and the selection and formulation of each component may be so determined that the proportion of solid phase at −40° C., preferably at −50° C. of the insulating oil is not more than 45% when said proportion of solid phase is calculated according to the foregoing equation of solid-liquid equilibrium.

In the calculation of the proportion of solid phase according to the foregoing solid-liquid equilibrium, as described above, the ordinary calculation method for the solid-liquid equilibrium can be used assuming that the components are mutually compatible in a liquid state and they do not form any solid solution with one another in a solid state.

It should be noted, as described above, that the calculation is done by assuming the activity coefficient $r_i$ equals 1. In the case of multi-component system, it is convenient to use a computer. For example, the calculation of solid-liquid equilibrium with regard to a simple two-component system is described in Chapter 6, "Solution and Phase Equilibrium", Physical Chemistry, Walter J. Moore, second ed., Published by Prentice-Hall.

The exemplary calculation on solid phase will be described briefly. Assuming that a liquid insulating oil consists of Substance A and Substance B. The eutectic point of this two-component system can be obtained by solving two simultaneous equations of the foregoing solid-liquid equilibrium equation in Substance A and another equation in Substance B.

When the temperature of a system is below the above obtained eutectic point, all the components of this composition are solidified, so that the proportion of solid phase is 100%.

When the temperature of a system is above the eutectic point, the temperature of the system is substituted for the temperature of the solid-liquid equilibrium equation to obtain the respective mole fractions $X_A$ and $X_B$. They are then compared with the mole fractions $X_A^1$ and $X_B^1$ for 100% liquid state, respectively. If the value of $X_A^1 - X_A$ is positive, the amount of Substance A corresponding to this value separates out as crystals. In connection with B, the amount to be separated out can be calculated likewise. The sum of these values is the quantity of solid phase in the system. Incidentally, because the quantities of each substances that are separated out can be known as above, the composition of the relevant liquid phase can be calculated by inverse operation at the system temperature.

When the electrical insulating oil composition according to the present invention is used, other known electrical insulating oils and known additives can be added at arbitrary ratios within the object of the invention. Exemplified as such electrical insulating oils are phenylxylylethane, diisopropylnaphthalene and monoisopropylbiphenyl.

The capacitors that is suitable for the impregnation with the electrical insulating oil composition of the present invention are the so-called foil-wound capacitors. The capacitors of this kind are made by winding or rolling a metal foil such as aluminum foil as an electrode together with plastic film as a dielectric or insulating material in layers to obtain capacitor elements, which are then impregnated with an electrical insulating oil. Though insulating paper can be used together with the plastic film, the use of plastic film only is preferable. As the plastic film, polyolefin film such as biaxially oriented polypropylene film is desirable. The impregnation of the electrical insulating oil composition into the capacitor elements can be done according to the conventional method.

The electrical insulating oil composition of the present invention comprises a plurality of specific components and the temperature to separate out crystals is low by the mutual effect of the depression of freezing point. The electrical insulating oil composition excels in low temperature characteristics and characterized in that the oil-filled capacitors which are impregnated with the electrical insulating oil composition can be employed practically at low temperatures of −40° C. to −50° C.

Furthermore, because the electrical insulating oil composition comprises bicyclic aromatic hydrocarbons having 14 carbon atoms, it excels in the hydrogen gas absorbing capacity and voltage withstanding characteristic.

In addition, the respective components of the electrical insulating oil composition of the present invention can be industrially produced inexpensively and they do not exert any undesirable influence on living bodies.

Accordingly, the electrical insulating oil composition of the invention is quite an excellent one in view of practical usage.

EXAMPLES

In the following, the present invention will be described in more detail with reference to several examples.

It is known that, in ordinary temperature to high temperature conditions, even when partial discharge occurred, the minute projections of electrode are remedied by repeating discharges, and the voltage withstanding characteristic is gradually improved.

Model capacitors were made by using only polypropylene film as a dielectric and they are impregnated with each of the bicyclic aromatic hydrocarbons having 14 carbon atoms in the foregoing Table 2. The initiating voltages of partial discharge at room temperature were measured with regard to the above capacitors. As supposed above, all the obtained voltages were as high as 110 to 140 V/μ.

These capacitors were cooled to −50° C. and partial discharge initiating voltages were measured. As a result, the obtained voltages varied widely. The discharge was initiated at 20 to 30 V/μ in the lowest ones and when the discharge was increased, the dielectric breakdown occurred often during the measuring.

This is considered that, because the rates of diffusion and absorption of hydrogen produced in the partial discharge are low at low temperatures, the discharge easily causes dielectric breakdown even when the discharge occurred at considerably lower voltages as compared with those at room temperature.

Accordingly, it is considered to be important that the partial discharge is not caused to initiate at the extremely low temperatures of −40° C. to −50° C. Thus, the partial discharge initiating voltages were measured using model capacitors.

The general method for measuring partial discharge initiating voltages is the ramp test in the conventional art, in which an electric voltage is raised at a regular rate and very simply, the voltage occurring partial discharge is measured. As described later, however, this method is not always suitable for measuring the behavior of partial discharge at low temperatures.

Ramp Test

The capacitors used in the experiment were as follows:

As the solid insulating material, a simultaneously stretched biaxially oriented polypropylene film of impregnation type that was made by Shin-etsu Film Co., Ltd. through tubular method, was used.

Two sheets of the film of 14 μ thick (micrometer method) was wound together with an electrode of aluminum foil to make capacitor elements of 0.3 to 0.4 μF in electrostatic capacity, which were put in a tin can. The can was flexible one so as to compensate the shrinkage of an insulating oil at low temperatures. The end portion of the electrode was not folded and left in the state as slit.

As the method to connect the electrode to a terminal, it is commonly done that a ribbon-like lead foil is inserted to the face of electrode in the capacitor element. With this method, the contact between the lead foil and the electrode becomes worse when crystals separate out and partial discharge occurs on the electrode, which makes the measurement impossible. In this experiment, therefore, the electrode was wound with its end protruded from the film and the protruded portions were connected together to the lead foil by spot-welding.

The thus prepared can-type capacitors were subjected to vacuum drying in an ordinary manner, and under the same vacuum condition, it was impregnated with an insulating oil, which was followed by sealing. It was then subjected to heat treatment at a maximum temperature of 80° C. for 2 days and nights in order to make the impregnation uniform and stabilized. After leaving it to stand at room temperature for 5 days, AC 1400 V (corres. to 50 V/μ) was applied to the capacitor for 16 hours in a thermostat at 30° C. and it was used for experiment.

The electrical insulating oil used here was an isomer mixture of benzyltoluenes that were synthesized from benzylchloride and toluene using $FeCl_3$ catalyst as disclosed in the foregoing U.S. Pat. No. 4,523,044. The composition thereof was 48.9 mole % of o-isomer, 6.8 mole % of m-isomer and 44.3 mole % of p-isomer.

The result of partial discharge (hereinafter referred to as "PD") in a ramp test at room temperature is shown in FIG. 3-A. The partial discharge initiating voltage (hereinafter referred to as "PDIV") was 110 to 120 v/μ. This is a potential gradient which was calculated with the thickness measured by a micrometer and this potential gradient will be applied hereinafter. Incidentally, this value corresponds to 120 to 131 V/μ in the potential gradient calculated with a thickness on the weight basis according to the usual method.

A test sample was put in a refrigerator, the temperature cycle of which could be programmed. It was cooled to −50° C. and after 3 hours, PDIV was measured to obtain a value of 80 V/μ (FIG. 3-B).

In another test, a temperature cycle was programmed such that the temperatures between −50° C. and −60° C. were reciprocated within 12 hours. A test sample was subjected to 4 cycles (48 hours) and then maintaining it at −50° C. for further 16 hours, the PDIV was measured, an exemplar result is shown in FIG. 3-C.

It is considered that crystals do not yet separate out sufficiently in the state of FIG. 3-B. The measurement was reproducible. In the state of FIG. 3-C, the PDIV was lowered to 46 V/μ and the reproducibility of measurement was quite worse. It was considered that the contents consisted of crystals almost totally but the liquid scarcely existed.

When the rate of raising voltage was lowered under the conditions of FIG. 3-C, PDIV was markedly lowered, which showed a tendency to approach the PDIV in an unimpregnated condition. This fact shows that the conventional ramp test method is insufficient for the measurement in low temperatures.

Thus, the period of time until PD occurred was measured and, from this, a voltage required to cause PD after a certain time length was obtained for judgement.

This means that the inventors of the present invention have developed a new test method instead of the aforesaid EDF Test Method for PCB and Ramp Test Method.

Experiment 1

Capacitors and an electrical insulating oil were prepared in the like manner as the foregoing ramp test.

A power supplier having a mechanism (zero cross start) which supplies power when alternating voltage became 0 after switched on, was used.

The charge of voltage was started at a value which is 20 V/μ higher than the above presumed PDIV in the ramp test. The time length to start partial discharge (hereinafter referred to as "PDST" was measured with maintaining the voltage constant. The detection of discharge and measurement of time were done by a data processing device of a precision of 0.02 second that was installed with a micro-processor. The voltage was then lowered by 5 V/μ to measure PDST. After that, the voltage was lowered by 5 V/μ step by step until the measured time exceeded 1 second. "The voltage by which partial discharge occurs after 1 second" was obtained by interpolation, which value is hereinafter referred to "PDIV 1 sec value".

As is clearly understood from the following description, the test results using PDIV 1 sec values were very reproducible as a measurement method.

Using 5 model capacitors, the measurement was done 5 times for each capacitor to obtain 25 resultant values.

The measurement of PDIV was started from the lowest temperature in the range of temperatures to be measured. Capacitors were cooled for 1 week in temperature cycles in which they were cooled at the measuring temperature in the daytime and then kept at a temperature lower by 10° C. in the nighttime. After that, they were left to stand at the measuring temperature for 24 hours and measured. The temperature was then raised to a higher measuring temperature and capacitors were left to stand for 24 hours, and after that, they were measured. Measurement at the respective temperatures were done like this.

As a result, PDIV 1 sec values varied in the range of 20 to 35 V/μ at −40° C. and −50° C. At −30° C. and −20° C., the average data was improved, however, the dispersion of data was increased. At −17° C. exceeding −20° C., the PDIV 1 sec value became abruptly higher. After that, reproducible data were obtained to the temperature of 0° C. In order to rearrange these data, the quantities (wt. %) of solid phase in the benzyltoluene isomer mixture for impregnating capacitors at the respective temperatures were calculated according to the foregoing equation of solid-liquid equilibrium. The obtained values and maximums and minimums of PDIV 1 sec values were plotted on FIG. 4.

Figure 4:
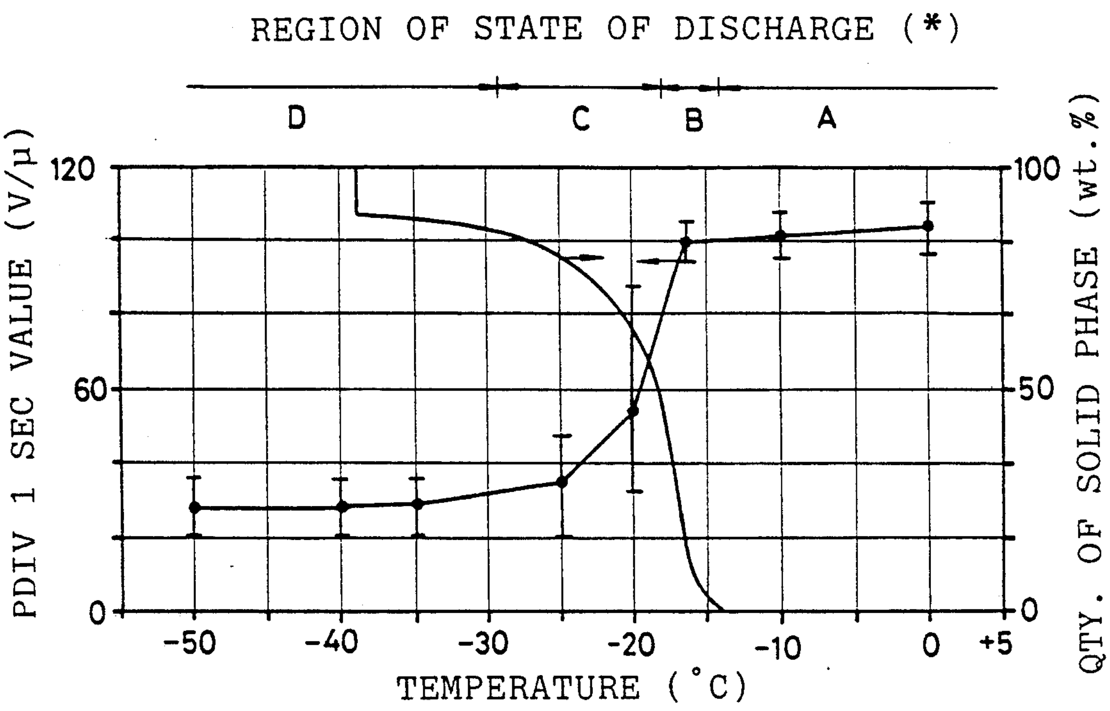
FIG. 4 is a graphic chart showing the relation between amounts of solid phase and PDIV 1 sec values, wherein the vertical range on each dot indicates the range of variation of a PDIV 1 sec value.

As will be understood from FIG. 4, the whole was solid at −40° C. and −50° C., at which PDIV 1 sec values were very low and almost the same as the capacitors that were not impregnated with an insulating oil. In a region from −20° C. to −30° C., PDIV 1 sec values varied widely and, according to the calculation at the respective temperatures, about 34% by weight and about 15% by weight of liquid phase were contained, respectively. That is, the ratio of solid phase was larger and the insulating oil was unsatisfactory as a liquid, or the end portions of electrodes in which partial discharge is liable to occur were covered by crystals of solid phase, therefore, it is considered that the PDIV 1 sec value varied widely.

Meanwhile, at −17° C. which is slightly higher than −20° C. by 3° C., 23% of solid phase exist according to calculation, however, all the 25 data was on the extension line of PDIV 1 sec values at −10° C. and 0° C. in which no solid phase existed. If any partial discharge was caused to occur even partially in the portions covered by crystals of solid phase, the lowering of PDIV 1 sec value might be observed in all probability. Practically, however, all the 25 data at −17° C. showed almost the same PDIV 1 sec values as those of −10° C. and 0° C. Form this fact, it should be noted that PDIV 1 sec value is improved critically at −17° C. Incidentally, the calculated quantities of solid phase considerably varies in the range between −20° C. and −17° C. This depends on the fact that the melting point of the eutectic composition of the two components of o-benzyltoluene and p-benzyltoluene, i.e. the main components of the impregnating oil, exists near this temperature range.

In order to clarify the relation between the quantities of solid phase and PDIV 1 sec values, symbols for each temperature region (region for each solid ratio) is defined as follows, taking the case of FIG. 4.

Region A:

An electrical insulating oil exists only in the state of liquid phase, PDIV 1 sec value is stable on a higher level, and of course reproducibility is good.

Region B:

The solid phase exists, however, PDIV 1 sec value exists on the extension line of the Region A, PDIV 1 sec value is on a higher level, and reproducibility is good.

Region C:

The solid phase exists, PDIV 1 sec value has no reproducibility. That is , PDIV 1 sec value sometimes shows a level near Region B, or it is on a very low level.

Region D:

Almost all are solid phase or the solid phase is much. PDIV 1 sec value is on a very low level, however, its reproducibility is good.

FIG. 4 will be described with the above definitions. The temperature region in which the solid phase exists and the calculated proportion of solid phase to the insulating oil is not more than 45% by weight, is the foregoing Region B. PDIV 1 sec value is reproducible and even though the level of PDIV 1 sec value is a little low, it exists on the extension line of the region of higher temperatures, i.e. Region A in which no solid phase exists.

As shown in the below-described Experiments 5 to 14, it was confirmed that this phenomenon occurs at far lower temperatures of −40° C. and −50° C.

Experiment 2

The following mixture of benzyltoluene isomers was prepared by adding separately prepared m-benzyltoluene to the benzyltoluene mixture of Experiment 1.

| Component | Mole % |
|---|---|
| o-Isomer | 35.1 |
| m-Isomer | 33.1 |
| p-Isomer | 31.8 |

Using the above electrical insulating oil, PDIV 1 sec values at the respective temperatures were measured in the like manner as Experiment 1.

ethylenated by Friedel-Crafts reaction by using a halogenated metal to synthesize ethylbiphenyls, wherein a composition of 66 mole % of m-isomer, 34 mole % of p-isomer, and less than 1 mole % of o-isomer is obtained. These methods can produce mixtures of position isomers of two-component system.

When the number of components in a position isomer mixture is reduced, however, even if the mixture contains much position isomer having a low melting point, it is still undesirable because the melting point of the mixture is naturally higher than the foregoing eutectic point of three-component system.

The 1,1-diphenylethylene is an excellent electrical insulating oil as described in the foregoing patent publication, however, the melting point of compound itself is high as shown in the foregoing Table 2, so that it cannot be used singly. Furthermore, there is a possibility that the melting point of an alkyl derivative is low. It is not desirable, however, because the proportion of olefin within one molecule and the aromaticity are lowered.

As described above, it can be expected that the bicyclic aromatic hydrocarbons (a) to (g) having 14 carbon atoms indicated in the foregoing Table 2, are used as excellent electrical insulating oils. However, any one of them cannot be a liquid at temperatures as low as −50° C. when they are used singly. Furthermore, it is apparent that even when they are obtained in a form of a mixture of position isomers by an ordinary synthesis method and the depression of melting point is expected, any electrical insulating oil which can be practically used at low temperatures of −50° C., cannot be obtained.

Thereupon, the inventors of the present application made detailed investigation with regard to the behaviors of oil-filled capacitors at temperatures as low as −40° C. to −50° C.

The mechanism of dielectric breakdown of foil-wound type oil-filled capacitors is generally considered as follows:

Oil-filled capacitors are made by properly selecting the combination of an insulating oil and a solid insulating material such as film or paper and the impregnation is carefully carried out to avoid the contamination with water and foreign materials and the formation of voids such as un-impregnated portions or bubbles. In such an oil-filled capacitor, the partial discharge is caused to occur locally, wherein gases, mainly hydrogen gas, are generated and they are diffused or absorbed in the peripheral regions, otherwise, the partial discharge will increase and finally the dielectric breakdown occurs. The portions to initiate the discharge are mainly in the peripheral ends of electrode foils. The concentration of electric field is caused to occur in the portions in which adjoining electrode foils are irregularly arranged by several tens microns or in the projections in micron order in the cut end portions of electrode foils. When these portions are insufficiently covered by an insulating oil, the partial discharge occurs. The portion suffered by the partial discharge sometimes spreads from one point, or in some case, the partial discharge occurs in many portions simultaneously.

Meanwhile, the separating out of crystals from a liquid insulating oil is also initiated irregularly. In many cases, the crystallizing out begins in a manner to deposit crystals on foreign substances other than the insulating oil such as solid insulating materials, electrode foils, and solid particles suspended in the liquid phase. When crystals are once formed, they play seeds for succeeding separating out of crystals, so that the solid phase (crystalline phase) in the liquid is increased. It is considered that the solid phase like this exists locally and irregularly in the liquid insulating oil.

The relation between the existence of solid phase and the local discharge will be discussed. Assuming that the quantity of the solid phase and the occurrence of local discharges are the matters of probability, even in a system in which the solid phase scarcely exists or produced, it cannot be avoided in view of probability that the solid phase sometimes exists in a portion where the concentration of electric field occurs, or that the insulation becomes insufficient with inviting the local discharge. In other words, the existence of any amount of solid phase (crystals) in a liquid cannot be allowed in order to avoid the local discharge.

In view of the above, if an insulating oil composition in which no crystallization occurs at all at low temperatires is prepared from the bicyclic aromatic hydrocarbons having 14 carbon atoms as shown in Table 2, though it cannot be said to be impossible but may be said to be impractical because the ranges of selection of the composition are quite narrow.

BRIEF SUMMARY OF THE INVENTION

Inventors of the present application made detailed investigation by experiments with regard to the relation between the calculated proportions of solid phase in liquid insulating oils at low temperature of −40° C. and the partial discharge of oil-filled capacitors. As a result, the present invention has been accomplished.

In the case that all the insulating oils in an oil-filled capacitor are liquid at temperatures as low as −40° C., the voltage occurring partial discharge is settled on a high level. On the other hand, when all the insulating oils are solidified, the voltage of partial discharge are naturally on a low level. However, in the case that the amount of solid phase is 45% by weight or less in the insulating oil system, the liquid forms a substantially continuous phase and the diffusion of gas is effected enough, so that the starting voltage of partial discharge is maintained at a higher level with a good reproducibility. In other words, the whole system shows the behavior like that of a all-liquid system.

It is therefore the object of the present invention to provide an improved electrical insulating oil composition which is excellent in low temperature characteristics and hydrogen gas absorbing capacity.

Another object of the present invention is to provide an improved electrical insulating oil composition which also has other excellent electrical characteristics.

A further object of the present invention is to provide an improved electrical insulating oil composition which can be easily produced and used in the practical industries.

With the above finding, a practical electrical insulating oil composition comprising the bicyclic aromatic hydrocarbons (a) to (g) shown in the foregoing Table 2 was prepared.

That is, the present invention relates to an electrical insulating oil composition having good low temperature characteristics and other electrical characteristics which composition comprises at least 4 members selected from the group consisting of the following 7 components:

(a) m-ethylbiphenyl,
(b) p-ethylbiphenyl,
(c) o-benzyltoluene,

PDIV 1 sec values were 20 to 40 V/μ at −40° C. and −50° C. but the value at −30° C. was 80 to 100 V/μ and was stable at that. It is considered that the solid phase does not exist at −30° C. because the eutectic point of the L three-component system is −39° C. and the composition of the insulating oil in this Experiment is close to the eutectic composition.

Experiment 3

A mixture of ethylbiphenyl isomers were prepared through the following procedure.

Biphenyl was ethylated by using ethylene as an ethylating agent and an alkylation catalyst of aluminum chloride to obtain a mixture of 62.8 mole % of m-isomer and 37.2 mole % of p-isomer. o-Ethylbiphenyl was not produced.

PDIV 1 sec values were measured with regard to the above composition in the like manner as Experiment 1.

The eutectic point of the above two-component 15 biphenyl mixture is −36° C. PDIV 1 sec values at −40° C. and −50° C. were between 26 to 53 V/μ. At temperatures above −30° C., stable PDIV 1 sec values of 80 to 100 V/μ were obtained just like Experiment 2.

Experiments 4 to 14

In these experiments, the electrical insulating oils as indicated in table 3 were prepared by the following procedures. With these electrical insulating oils, PDIV 1 sec values at the respective temperatures were measured in the like manner as Experiment 1.

No. 4:

1,1-Diphenylethylene and the oil in Experiment 1 were mixed in a ratio of 1:2.

No. 5:

1,1-Diphenylethane and the oil in Experiment 1 were mixed in a ratio of 1:2.

No. 6:

The oil in Experiment 3; 1,1-diphenylethane and 1,1-diphenylethylene were mixed in a ratio of 1:0.3:0.7.

No. 7:

The oils in Experiment 1 and in Experiment 3 were mixed in a ratio of 1:1.

No. 8:

The oils in Experiment 1, Experiment 2 and Experiment 3 were mixed in a ratio of 1:1:1.

No. 9:

The oil in Experiment 1; 1,1-diphenylethane and 1,1-diphenylethylene were mixed in a ratio of 2:1:1.

No. 10:

The oil in Experiment 2, 1,1-diphenylethane and 1,1-diphenylethylene were mixed in a ratio of 2:1:1.

No. 11:

The oils in Experiment 1 and Experiment 3, and 1,1-diphenylethane were mixed in a ratio of 2:2:1.

No. 12:

0 The oils in Experiment 1 and Experiment 3, and 1,1-diphenylethylene were mixed in a ratio of 2:2:1.

No. 13:

The oils in Experiment 1 and Experiment 3; 1,1-diphenylethane, and 1,1-diphenylethylene were mixed in a ratio of 2:1:1:1.

No. 14:

The oils in Experiment 1 and Experiment 3; 1,1-diphenylethane, and 1,1-diphenylethylene were mixed in a ratio of 40:20:25:15.

In the above Experiments 4 to 14, PDIV 1 sec values were measured in the like manner as Experiment 1. In connection with the results of measurement, the calculated proportions of solid phase at −40° C. and −50° C. and the behavior of PDIV 1 sec values as shown in Experiment 1 at these temperatures in the form of Regions A to D are shown.

The results are shown in the following Table 3 together with those in Experiments 1 to 3.

TABLE 3

| | Experiment No. | | | | | | |
|---|---|---|---|---|---|---|---|
| | 1 | 2 | 3 | 4 | 5 | 6 | 7 |
| | Number of Components | | | | | | |
| | 3 | 3 | 2 | 4 | 4 | 4 | 5 |
| m-Ethylbiphenyl | — | — | 62.8 | — | — | 31.4 | 31.4 |
| p-Ethylbiphenyl | — | — | 37.2 | — | — | 18.6 | 18.6 |
| o-Benzyltoluene | 48.9 | 35.1 | — | 32.6 | 32.6 | — | 24.4 |
| m-Benzyltoluene | 6.8 | 33.1 | — | 4.5 | 4.5 | — | 3.4 |
| p-Benzyltoluene | 44.3 | 31.8 | — | 29.6 | 29.6 | — | 22.2 |
| 1,1-Diphenyl ethane | — | — | — | — | 33.3 | 15.0 | — |
| 1,1-Diphenyl ethylene | — | — | — | 33.3 | — | 35.0 | — |
| Qty. of Solid Phase (wt %) | | | | | | | |
| −40° C. | 100 | 100 | 100 | 87.9 | 76.6 | 10.4 | 18.0 |
| −50° C. | 100 | 100 | 100 | 100 | 100 | 26.4 | 80.2 |
| Region of State of Discharge | | | | | | | |
| −40° C. | D | D | D | D | D | B | B |
| −50° C. | D | D | D | D | D | B | C |

| | Experiment No. | | | | | | |
|---|---|---|---|---|---|---|---|
| | 8 | 9 | 10 | 11 | 12 | 13 | 14 |
| | Number of Components | | | | | | |
| | 5 | 5 | 5 | 6 | 6 | 7 | 7 |
| m-Ethylbiphenyl | 20.9 | — | — | 25.1 | 25.1 | 20.9 | 25.1 |
| p-Ethylbiphenyl | 12.4 | — | — | 14.9 | 14.9 | 12.4 | 14.9 |
| o-Benzyltoluene | 28.0 | 24.5 | 17.6 | 19.6 | 19.6 | 16.3 | 9.8 |
| m-Benzyltoluene | 13.3 | 3.4 | 16.5 | 2.7 | 2.7 | 2.3 | 1.4 |
| p-Benzyltoluene | 25.4 | 22.1 | 15.9 | 17.7 | 17.7 | 14.8 | 8.9 |
| 1,1-Diphenyl ethane | — | 25.0 | 25.0 | 20.0 | — | 16.7 | 25.0 |
| 1,1-Diphenyl ethylene | — | 25.0 | 25.0 | — | 20.0 | 16.7 | 15.0 |
| Qty. of Solid Phase (wt %) | | | | | | | |
| −40° C. | 28.4 | 24.7 | 1.2 | 3.7 | 3.6 | 0.0 | 0.0 |
| −50° C. | 44.0 | 87.9 | 41.4 | 21.7 | 32.7 | 12.0 | 0.0 |
| Region of State of Discharge | | | | | | | |
| −40° C. | B | B | B | B | B | A | A |
| −50° C. | B | C | B | B | B | B | A |

From the results of Table 3, the following facts will be understood.

(1) In order to prepare capacitors exhibiting sufficiently high PDIV 1 sec values at temperatures of −40° C. to −50° C., the electrical insulating oil composition must contain at least 4 components out of the 7 components of the foregoing bicyclic aromatic hydrocarbons having 14 carbon atoms of (a) to (g).

(2) The calculated quantity of solid phase at −40° C. to −50° C. is not more than 45% by weight relative to the insulating oil, the PDIV 1 sec value is in Region B, which shows almost the same behavior as that of Region A in which no crystal exists. Accordingly, even when the solid phase exists, if the quantity of the solid phase is not more than 45% by weight, the performance of capacitor can be satisfactorily exhibited.

As clearly understood also from the results in Table 3, in FIG. 4 for the foregoing Experiment 1, it was confirmed that the phenomenon in the boundary region near −20° C. can also be observed in the far lower temperature region of −40° C. to −50° C.

This fact shows that the phenomenon at −20° C. is reproduced at −40° C. to −50° C. because the molecular weights of the bicyclic aromatic hydrocarbons having 14 carbon atoms are low and the viscosities of them are also low.

As described above, in the case that the quantity of solid phase exceeds 45% by weight at −40° C. to −50° C., the behavior of PDIV 1 sec value is in Region C. When the quantity of solid phase is increased, the PDIV 1 sec values become 20 to 40 V/μ of Region D almost like the unimpregnated state.

In the case that the quantity of solid phase is not more than 45% by weight in the composition of the bicyclic aromatic hydrocarbons having 14 carbon atoms of (a) to (g) at −40° C. to −50° C., the reason why the composition exhibits the characteristics just like those of all liquid phase composition is supposed as follows:

It is considered that the cause for the lowering of insulating properties in this system by the existence of solid phase is basically due to the extent or continuity of the liquid phase in contact with the portions to give rise the partial discharge, rather than the phenomenon to impair the insulating function because of the deposition of solid phase to electrode.

When the partial discharge is caused to occur, it is considered that gases, mainly hydrogen gas, are previously generated. When the concentration of gases increased partially, it exceeds its saturation level to produce bubbles and causes the partial discharge. The consumption of energy begins before the occurrence of the partial discharge and, therefore, the portions microscopically close to the point of partial discharge is in the state of liquid when the partial discharge starts. In this state, it is important that the generated gas is diffused into other portions within its solubility or to be consumed in the other portions by gas absorption. The gas diffusion herein referred to includes the movement of the gas dissolved in a liquid by the difference in gas concentration and also the movement of the liquid itself dissolving the gas. In order to facilitate these movements, the sufficient amount of liquid phase must exist in a continuous state in the neighborhood.

In the event that the total amount of solid phase exceeds 45% by weight, the liquid phase becomes discontinuous to form separated dispersion phase, so that the above-mentioned mass transfer does not occur smoothly.

Meanwhile, if the amount of solid phase is not more than 45% by weight, the volume of liquid phase becomes considerably large by the reduction of volume in solidifying. Even when the overall appearance of the insulating oil is full of crystals, it is considered that the liquid phase exists substantially in a continuous phase.

Therefore, if the quantity of solid phase is not more than 45% by weight at −40° C. to −50° C. in the foregoing bicyclic aromatic hydrocarbons having 14 carbon atoms of (a) to (g), a practical electrical insulating oil for use in impregnating capacitors can be obtained.

What is claimed is:

1. An electrical insulating oil composition having good low temperature characteristics which composition comprises at least 4 members selected from the group consisting of the following 7 components:

(a) m-ethylbiphenyl,
(b) p-ethylbiphenyl,
(c) o-benzyltoluene,
(d) m-benzyltoluene,
(e) p-benzyltoluene,
(f) 1,1-diphenylethane, and
(g) 1,1-diphenylethylene and is characterized in that the proportion of solid phase at a temperature of −40° C. of said electrical insulating oil system is not more than 45% by weight and the proportion of the total quantity of solid phase is calculated according to the following general equation of solid-liquid equilibrium:

$$X_i = \exp\left[\frac{\Delta Hf}{R}\left(\frac{1}{Tf} - \frac{1}{T}\right)\right]$$

wherein $X_i$ is the equilibrium mole fraction of a component i of said 7 components in the liquid phase of said composition, $\Delta Hf$ is the heat of fusion ($cal.mol^{-1}$) of said component i as a pure substance, $Tf$ is the melting point (K) of said component i as a pure substance, T is the temperature (K) of the system, and R is the gas constant ($cal.mol^{-1}.K^{-1}$).

2. The electrical insulating oil composition as claimed in claim 1, wherein said temperature of the system is −50° C.

3. An oil-filled electrical capacitor which is impregnated with an electrical insulating oil composition having good low temperature characteristics; said composition comprises at least 4 members selected from the group consisting of the following 7 components:

(a) m-ethylbiphenyl,
(b) p-ethylbiphenyl,
(c) o-benzyltoluene,
(d) m-benzyltoluene,
(e) p-benzyltoluene,
(f) 1,1-diphenylethane, and
(g) 1,1-diphenylethylene and is characterized in that, the proportion of solid phase at a temperature of −40° C. of said electrical insulating oil system is not more than 45% by weight and the proportion of the total quantity of solid phase is calculated according to the following general equation of solid-liquid equilibrium:

$$X_i = \exp\left[\frac{\Delta Hf}{R}\left(\frac{1}{Tf} - \frac{1}{T}\right)\right]$$

wherein $X_i$ is the equilibrium mole fraction of a component i in the liquid phase of said composition, $\Delta Hf$ is the heat of fusion cal.mol[31 1]) of said component i as a pure substance, $Tf$ is the melting point (K) of said component i as a pure substance, T is the temperature (K) of the system, and R is the gas constant ($cal.mol^{-1}.K^{-1}$).

4. The oil-filled electrical capacitor according to claim 3, wherein said capacitor has a rolled plastic film.

5. The oil-filled electrical capacitor according to claim 4, wherein said plastic film is a polyolefin film.

6. The oil-filled electrical capacitor according to claim 5, wherein said polyolefin film is polypropylene film.

* * * * *

UNITED STATES PATENT AND TRADEMARK OFFICE
CERTIFICATE OF CORRECTION

PATENT NO. : 5,015,793

DATED : May 14, 1991

INVENTOR(S) : Atsushi Sato, et al.

It is certified that error appears in the above-identified patent and that said Letters Patent is hereby corrected as shown below:

Column 10, lines 19-20: "temperatires" should read as --temperatures--

Column 17, line 5: delete "L"

Column 20, line 55, Claim 3: "cal.mol$^{31\ 1}$)" should read as --cal.mol$^{-1}$)--

Signed and Sealed this

Fifteenth Day of December, 1992

*Attest:*

DOUGLAS B. COMER

*Attesting Officer*

*Acting Commissioner of Patents and Trademarks*